(12) United States Patent
Agarwal

(10) Patent No.: US 12,228,686 B2
(45) Date of Patent: Feb. 18, 2025

(54) SYSTEMS AND METHODS TO IDENTIFY AN ENTITY USING A 3D LAYOUT

(71) Applicant: Visa International Service Association, San Francisco, CA (US)

(72) Inventor: Ved Prakash Sajjan K Agarwal, Dubai (AE)

(73) Assignee: Visa International Service Association, San Francisco, CA (US)

( * ) Notice: Subject to any disclaimer, the term of this patent is extended or adjusted under 35 U.S.C. 154(b) by 49 days.

(21) Appl. No.: 17/763,689

(22) PCT Filed: Oct. 31, 2019

(86) PCT No.: PCT/US2019/059095
§ 371 (c)(1),
(2) Date: Mar. 25, 2022

(87) PCT Pub. No.: WO2021/086370
PCT Pub. Date: May 6, 2021

(65) Prior Publication Data
US 2022/0342059 A1    Oct. 27, 2022

(51) Int. Cl.
*G01S 7/52*      (2006.01)
*G01S 15/89*     (2006.01)
(52) U.S. Cl.
CPC ...... *G01S 7/52004* (2013.01); *G01S 15/8993* (2013.01); *G01S 2007/52012* (2013.01)
(58) Field of Classification Search
CPC .......... G01S 15/88; G01S 15/42; G01S 7/539; G01S 7/52004; G01S 15/8993; G01S 2007/52012; G01S 3/00; G01S 3/80; G01S 3/8006; G01S 3/802; G01S 3/8027; G01S 15/00; G01S 15/02; G01S 15/04;
(Continued)

(56) References Cited

U.S. PATENT DOCUMENTS 10,225,680 B2 *   3/2019   Donaldson ............ H04M 3/568
10,297,056 B2 *   5/2019   Sudidhala ............ G06Q 10/101
(Continued)

FOREIGN PATENT DOCUMENTS

CN    110324475 A    10/2019
WO    2019089432 A1    5/2019

*Primary Examiner* — Daniel L Murphy
*Assistant Examiner* — Amie M Ndure
(74) *Attorney, Agent, or Firm* — The Webb Law Firm

(57) ABSTRACT

A computer-implemented method including: triggering, with at least one processor, an acoustic wave generator to generate a predefined acoustic wave directed toward a 3-dimensional (3D) layout associated with an entity from plurality of entities, wherein each of the plurality of entities is registered with a corresponding 3D layout embedded with a predefined number of 3D geometric figures; in response to receiving a modified acoustic wave from the 3D layout, comparing, with at least one processor, the modified acoustic wave with a plurality of calibrated acoustic waves associated with the plurality of entities to determine identification details comprising a match between the modified acoustic wave and a calibrated acoustic wave from the plurality of calibrated acoustic waves; and based on the identification details, identifying, with at least one processor, the entity related to the calibrated acoustic wave. A system and medium are also disclosed.

9 Claims, 8 Drawing Sheets

(58) Field of Classification Search
CPC .......... G01S 15/06; G01S 15/74; G01S 15/89; G06K 9/00201; G06K 9/00214; G06T 17/00; H04R 3/005; H04R 29/00; H04R 2430/23
See application file for complete search history.

(56) References Cited

U.S. PATENT DOCUMENTS

| | | | |
|---|---|---|---|
| 10,827,292 B2* | 11/2020 | Hall | H04S 7/303 |
| 11,140,502 B2* | 10/2021 | Hall | H04S 5/00 |
| 11,513,205 B2* | 11/2022 | Zhou | G06N 3/045 |
| 11,538,016 B2* | 12/2022 | Ghosh | G06Q 20/34 |
| 2005/0052948 A1 | 3/2005 | Caulfield et al. | |
| 2015/0036847 A1* | 2/2015 | Donaldson | H04S 7/303 |
| | | | 381/303 |
| 2015/0036848 A1* | 2/2015 | Donaldson | H04S 7/303 |
| | | | 381/303 |
| 2015/0373537 A1* | 12/2015 | Toksvig | H04W 12/02 |
| | | | 726/4 |
| 2016/0027325 A1* | 1/2016 | Malhotra | G09B 5/04 |
| | | | 434/247 |
| 2016/0140553 A1 | 5/2016 | Faith et al. | |
| 2016/0371947 A1 | 12/2016 | Neese et al. | |
| 2017/0112671 A1* | 4/2017 | Goldstein | H04R 25/554 |
| 2017/0323481 A1* | 11/2017 | Tran | H04N 23/611 |
| 2017/0357868 A1 | 12/2017 | Derakhshani et al. | |
| 2020/0141965 A1* | 5/2020 | Sarangpani | G01S 7/536 |
| 2020/0309930 A1* | 10/2020 | Zhou | G01S 15/86 |
| 2021/0357901 A1* | 11/2021 | Ghosh | G06Q 20/401 |

* cited by examiner

SYSTEMS AND METHODS TO IDENTIFY AN ENTITY USING A 3D LAYOUT

CROSS-REFERENCE TO RELATED APPLICATION

This application is the United States national phase of International Application No. PCT/US2019/059095 filed Oct. 31, 2019, the entire disclosure of which is hereby incorporated by reference in its entirely.

BACKGROUND

1. Technical Field

The present disclosure relates generally to acoustic systems for identifying an entity and more specifically, but not particularly, to systems and methods to identify an entity using acoustics waves and a 3-dimensional (3D) layout.

2. Technical Considerations

Various techniques are employed for payment transactions. Cashless payment transactions are achieved using various payment applications. It is necessary that an entity to which a transaction is to be made must be identified, using the payment applications, before initiating a transaction. Well known means for identifying entities are bar codes and Quick Response (QR) codes. Such identification uses image processing modules to scan codes and process images of codes to identify the entity. It may be required that, for scanning a code, a user needs to be in front of the code and hold a camera of a user device at a closer proximity to detect the code. This kind of a visual code requires a device to be in closer proximity and a poor image quality can restrict readability of the code.

The information disclosed in this background of the disclosure section is only for enhancement of understanding of the general background of the invention and should not be taken as an acknowledgement or any form of suggestion that this information forms the prior art already known to a person skilled in the art.

SUMMARY

In some non-limiting embodiments or aspects, provided is a computer-implemented method comprising: triggering, with at least one processor, an acoustic wave generator to generate a predefined acoustic wave directed towards a 3-dimensional (3D) layout associated with an entity from plurality of entities, wherein each of the plurality of entities are registered with a corresponding 3D layout embedded with a predefined number of 3D geometric figures; in response to receiving a modified acoustic wave from the 3D layout, comparing, with at least one processor, the modified acoustic wave with a plurality of calibrated acoustic waves associated with the plurality of entities, to determine identification details comprising a match between the modified acoustic wave and a calibrated acoustic wave from the plurality of calibrated acoustic waves; and based on the identification details, identifying, with at least one processor, the entity related to the calibrated acoustic wave.

In some non-limiting embodiments or aspects, each of the 3D geometric figures is associated with at least one of the following: a predefined shape, a predefined size, a predefined material, a predefined orientation, or any combination thereof. In some non-limiting embodiments or aspects, the computer-implemented method further comprises generating, with at least one processor, the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity. In some non-limiting embodiments or aspects, the modified acoustic wave is obtained by reflecting the predefined acoustic wave on the 3D layout.

In some non-limiting embodiments or aspects, provided is a system comprising: one or more processors; and a memory communicatively coupled to the processor, wherein the memory stores processor-executable instructions, which, on execution, cause the one or more processors to: trigger an acoustic wave generator to generate a predefined acoustic wave directed towards a 3-dimensional (3D) layout associated with an entity from plurality of entities, wherein each of the plurality of entities are registered with a corresponding 3D layout embedded with a predefined number of 3D geometric figures; in response to receiving a modified acoustic wave from the 3D layout, compare the modified acoustic wave with a plurality of calibrated acoustic waves associated with the plurality of entities, to determine identification details comprising a match between the modified acoustic wave and a calibrated acoustic wave from the plurality of calibrated acoustic waves; and based on the identification details, identify the entity related to the calibrated acoustic wave.

In some non-limiting embodiments or aspects, each of the 3D geometric figures is associated with at least one of the following: a predefined shape, a predefined size, a predefined material, a predefined orientation, or any combination thereof. In some non-limiting embodiments or aspects, the one or more processors are further programmed or configured to generate the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity. In some non-limiting embodiments or aspects, the modified acoustic waves are obtained by reflecting the predefined acoustic waves on the 3D layout.

In some non-limiting embodiments or aspects, provided is a non-transitory computer readable medium including instructions stored thereon that when processed by one or more processors cause a system to perform operations comprising: triggering, with at least one processor, an acoustic wave generator to generate a predefined acoustic wave directed towards a 3-dimensional (3D) layout associated with an entity from plurality of entities, wherein each of the plurality of entities are registered with a corresponding 3D layout embedded with a predefined number of 3D geometric figures; in response to receiving a modified acoustic wave from the 3D layout, comparing, with at least one processor, the modified acoustic wave with a plurality of calibrated acoustic waves associated with the plurality of entities, to determine identification details comprising a match between the modified acoustic wave and a calibrated acoustic wave from the plurality of calibrated acoustic waves; and based on the identification details, identifying, with at least one processor, the entity related to the calibrated acoustic wave.

In some non-limiting embodiments or aspects, each of the 3D geometric figures is associated with at least one of the following: a predefined shape, a predefined size, a predefined material, a predefined orientation, or any combination thereof. In some non-limiting embodiments or aspects, the operations further comprise generating, with at least one processor, the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity. In some non-limiting embodiments or aspects, the modified acoustic wave is obtained by reflecting the predefined acoustic wave on the 3D layout.

Further non-limiting embodiments or aspects are set forth in the following numbered clauses.

Clause 1: A computer-implemented method comprising: triggering, with at least one processor, an acoustic wave generator to generate a predefined acoustic wave directed toward a 3-dimensional (3D) layout associated with an entity from a plurality of entities, wherein each of the plurality of entities is registered with a corresponding 3D layout embedded with a predefined number of 3D geometric figures; in response to receiving a modified acoustic wave from the 3D layout, comparing, with the at least one processor, the modified acoustic wave with a plurality of calibrated acoustic waves associated with the plurality of entities to determine identification details comprising a match between the modified acoustic wave and a calibrated acoustic wave from the plurality of calibrated acoustic waves; and based on the identification details, identifying, with the at least one processor, the entity related to the calibrated acoustic wave.

Clause 2: The computer-implemented method of clause 1, wherein each of the 3D geometric figures is associated with at least one of the following: a predefined shape, a predefined size, a predefined material, a predefined orientation, or any combination thereof.

Clause 3: The computer-implemented method of clause 1 or 2, further comprising generating, with at least one processor, the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity.

Clause 4: The computer-implemented method of any of clauses 1-3, wherein the modified acoustic wave is obtained by reflecting the predefined acoustic wave on the 3D layout.

Clause 5: A system comprising: one or more processors; and a memory communicatively coupled to the processor, wherein the memory stores processor-executable instructions, which, on execution, cause the one or more processors to: trigger an acoustic wave generator to generate a predefined acoustic wave directed toward a 3-dimensional (3D) layout associated with an entity from a plurality of entities, wherein each of the plurality of entities is registered with a corresponding 3D layout embedded with a predefined number of 3D geometric figures; in response to receiving a modified acoustic wave from the 3D layout, compare the modified acoustic wave with a plurality of calibrated acoustic waves associated with the plurality of entities to determine identification details comprising a match between the modified acoustic wave and a calibrated acoustic wave from the plurality of calibrated acoustic waves; and based on the identification details, identify the entity related to the calibrated acoustic wave.

Clause 6: The system of clause 5, wherein each of the 3D geometric figures is associated with at least one of the following: a predefined shape, a predefined size, a predefined material, a predefined orientation, or any combination thereof.

Clause 7: The system of clause 5 or 6, wherein the one or more processors are further programmed or configured to generate the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity.

Clause 8: The system of any of clauses 5-7, wherein the modified acoustic wave is obtained by reflecting the predefined acoustic wave on the 3D layout.

Clause 9: A non-transitory computer readable medium including instructions stored thereon that when processed by one or more processors cause a system to perform operations comprising: triggering, with at least one processor, an acoustic wave generator to generate a predefined acoustic wave directed toward a 3-dimensional (3D) layout associated with an entity from a plurality of entities, wherein each of the plurality of entities is registered with a corresponding 3D layout embedded with a predefined number of 3D geometric figures; in response to receiving a modified acoustic wave from the 3D layout, comparing, with at least one processor, the modified acoustic wave with a plurality of calibrated acoustic waves associated with the plurality of entities to determine identification details comprising a match between the modified acoustic wave and a calibrated acoustic wave from the plurality of calibrated acoustic waves; and based on the identification details, identifying, with at least one processor, the entity related to the calibrated acoustic wave.

Clause 10: The medium of clause 9, wherein each of the 3D geometric figures is associated with at least one of the following: a predefined shape, a predefined size, a predefined material, a predefined orientation, or any combination thereof.

Clause 11: The medium of clause 9 or 10, wherein the operations further comprise generating, with at least one processor, the plurality of calibrated acoustic waves for each of the plurality of entities by: directing, or causing the direction of, a plurality of predefined acoustic waves onto a 3D layout of the entity, wherein each of the plurality of predefined acoustic waves is directed in each of a plurality of directions; receiving modified acoustic waves, reflected by the 3D layout, in relation to each of the plurality of predefined acoustic waves; and storing the received modified acoustic waves as the plurality of calibrated acoustic waves for the entity.

Clause 12: The medium of any of clauses 9-11, wherein the modified acoustic wave is obtained by reflecting the predefined acoustic wave on the 3D layout.

In some non-limiting embodiments or aspects, the present disclosure relates to a computer-implemented method for identifying an entity. Initially, an acoustic wave generator is triggered to generate a predefined acoustic wave directed toward a 3D layout associated with an entity from plurality of entities. Each of the plurality of entities is registered with a corresponding 3D layout embedded with a predefined number of 3D geometric figures. A modified acoustic wave is received from the 3D layout. The modified acoustic wave is compared with plurality of calibrated acoustic waves associated with the plurality of entities to identify a match between the modified acoustic wave with a calibrated acoustic wave from the plurality of calibrated acoustic waves. Identification details of the entity related to the calibrated acoustic wave is received to identify the entity.

In some non-limiting embodiments or aspects, the present disclosure relates to a system for identifying an entity. The system includes a processor and a memory communicatively coupled to the processor. The memory stores processor-executable instructions, which on execution cause the processor to identify the entity. Initially, an acoustic wave generator is triggered to generate a predefined acoustic wave directed toward a 3D layout associated with an entity from a plurality of entities. Each of the plurality of entities is re registered with a corresponding 3D layout embedded with a predefined number of 3D geometric figures. The modified acoustic wave is received from the 3D layout. The modified acoustic wave is compared with a plurality of calibrated acoustic waves associated with the plurality of entities to identify a match between the modified acoustic wave with a calibrated acoustic wave from the plurality of calibrated acoustic waves. Identification details of the entity related to the calibrated acoustic wave is received to identify the entity.

In some non-limiting embodiments or aspects, the present disclosure relates to a non-transitory computer readable medium including instructions stored thereon. The instructions, when processed by at least one processor, cause a device to identify an entity. Initially, an acoustic wave generator is triggered to generate a predefined acoustic wave directed toward a 3D layout associated with an entity from plurality of entities. Each of the plurality of entities is registered with a corresponding 3D layout embedded with a predefined number of 3D geometric figures. A modified acoustic wave is received from the 3D layout. The modified acoustic wave is compared with a plurality of calibrated acoustic waves associated with the plurality of entities to identify a match between the modified acoustic wave with a calibrated acoustic wave from the plurality of calibrated acoustic waves. Identification details of the entity related to the calibrated acoustic wave are received to identify the entity.

The foregoing summary is illustrative only and is not intended to be in any way limiting. In addition to the illustrative aspects, embodiments, and features described above, further aspects, embodiments, and features may become apparent by reference to the drawings and the following detailed description. Additional features and advantages are realized through the techniques of the present disclosure. Other embodiments and aspects of the disclosure are described in detail herein and are considered a part of the claimed disclosure.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
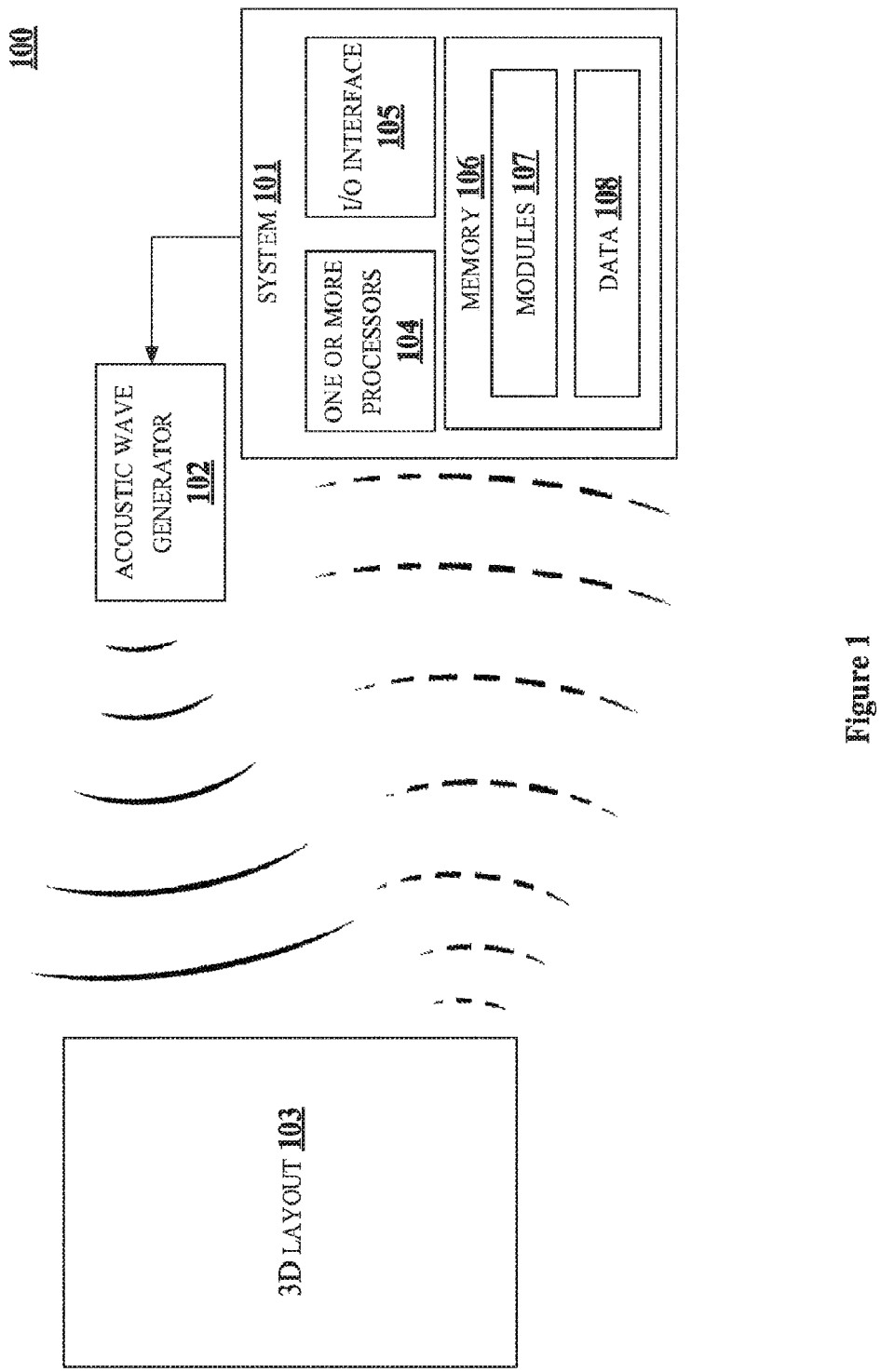
FIG. 1 illustrates an exemplary environment of a system for identifying an entity using a 3D layout, in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to methods and systems for accurately identifying an entity using a 3D layout and acoustic waves. The 3D layout includes a plurality of geometric figures and the 3D layout may be unique to the entity. The present disclosure proposes to direct predefined acoustic waves onto the 3D layout and reflected acoustics waves, which may be modified, are processed to identify the entity. The present disclosure proposes to accurately identify an entity irrespective of proximity or orientation of a user with respect to the 3D layout.

FIG. 1 shows an exemplary environment 100 of a system 101 for identifying an entity using a 3D layout 103, in accordance with some non-limiting embodiments or aspects of the present disclosure. The environment 100 may include the system 101 in communication with an acoustic wave generator 102 and the 3D layout 103. The system 101 may be configured to transmit acoustic waves via the acoustic wave generator 102 and receive reflected acoustic waves from the 3D layout 103. The system 101 may include one or more processors 104, an I/O interface 105, and a memory 106. In some non-limiting embodiments or aspects, the memory 106 may be communicatively coupled to the one or more processors 104. The memory 106 stores instructions, executable by the one or more processors 104, which on execution, may cause the system 101 to identify the entity as proposed in the present disclosure. In some non-limiting embodiments or aspects, the memory 106 may include one or more modules 107 and data 108. The one or more modules 107 may be configured to perform the steps of the present disclosure using the data 108 to identify the entity. In some non-limiting embodiments or aspects, each of the one or more modules 107 may be a hardware unit which may be outside the memory 106 and coupled with the system 101. In some non-limiting embodiments or aspects, the system 101 may be implemented in a variety of computing systems, such as a laptop computer, a desktop computer, a personal computer (PC), a notebook, a smartphone, a tablet, e-book readers, a server, a network server, and the like. Preferably, the system 101 may be implemented in a portable user device (not shown in the figures) for easily identifying the entity.

In some non-limiting embodiments or aspects, the acoustic wave generator 102 may be configured to generate acoustic waves (also referred to as sound waves). The acoustic wave generator 102 may communicate with the system 101 to receive a trigger and generate a predefined acoustic wave. The trigger may be provided by a user by directing the system 101 toward the 3D layout 103. In some non-limiting embodiments or aspects, the trigger may be provided via user interface of the user device implementing the system 101. In some non-limiting embodiments or aspects, the trigger may be provided by pressing a button associated with the user device implementing the system 101. One or more other configurations may be used to provide the trigger to the acoustic wave generator 102. In some non-limiting embodiments or aspects, the system 101 may communicate with the acoustic wave generator 102 via a communication network (not shown in the figures). The communication network may include, without limitation, a direct interconnection, Local Area Network (LAN), Wide Area Network (WAN), wireless network (e.g., using Wireless Application Protocol), the Internet, and the like. In some non-limiting embodiments or aspects, the acoustic wave generator 102 may be an integral part of the system 101. In such a case, a transmitter associated with the system 101 may be used to output the predefined acoustic wave. For example, the system 101 may be implemented in a smartphone of a user, and the acoustic wave generator 102 may be an integral part of the smartphone, and the speaker of the smartphone may be used to transmit the predefined acoustic wave.

When providing the bigger, at least one of the system 101 and the acoustic wave generator 102 should be oriented toward the 3D layout 103, such that the predefined acoustic wave is projected on surface of the 3D layout 103. The at least one of the system 101 and the acoustic wave generator 102 is to be oriented or positioned in such a way that the predefined acoustic wave is directed toward the 3D layout 103 for such projection.

The 3D layout 103 may be associated with an entity from a plurality of entities. Each of the plurality of entities is registered with corresponding 3D layout 103 embedded with a predefined number of 3D geometric figures. In some non-limiting embodiments or aspects, an entity may be a vendor, a customer, a commodity which is to be purchased or advertised, a business profile, and the like. To identify the entity, the system 101 directs the predefined acoustic wave towards the corresponding 3D layout 103. Each of the plurality of entities is associated with unique 3D layout 103. Uniqueness may be achieved by using the 3D geometric figures with a predefined shape, a predefined size, a predefined material, a predefined orientation, or any combination thereof for each of the plurality of entities.

When the predefined acoustic wave is directed toward the 3D layout 103, the geometric figures of the 3D layout 103 may reflect a modified acoustic wave for the predefined acoustic wave. The system 101 may be configured to receive the modified acoustic wave from the 3D layout 103. In some non-limiting embodiments or aspects, the system 101 may be configured to implement a receiver module (not shown in the figure) to receive the modified acoustic wave.

Upon receiving the modified acoustic wave, the system 101 may be configured to compare the modified acoustic wave with a plurality of calibrated acoustic waves associated with the plurality of entities. In some non-limiting embodiments or aspects, the system 101 may be associated with a receiver to receive the modified acoustic wave. For example, for the system 101 implemented in the smartphone, a component of the smartphone used to receive the modified acoustic wave.

For identifying the entity in real-time, the system 101 may be configured to generate the plurality of calibrated acoustic waves for each of the plurality of entities during registration of each of the plurality of entities. The plurality of calibrated acoustic waves generated for the plurality of entities may be pre-stored in the memory 106 of the system 101, and used in real-time, to identify the entity. In some non-limiting embodiments or aspects, the plurality of calibrated acoustic waves may be generated by the system 101 and pre-stored in a repository (not shown in the figure) associated with the system 101. The plurality of calibrated acoustic waves may be retrieved from the repository, in real-time, during identification of the entity.

In some non-limiting embodiments or aspects, the plurality of calibrated acoustic waves for an entity may be generated by, initially, directing a plurality of predefined acoustic waves onto a 3D layout 103 of the entity. In some non-limiting embodiments or aspects, the plurality of predefined acoustic waves may be directed in each of the plurality of directions. The plurality of directions may vary with respect to distance from the 3D layout 103, orientation with respect to the 3D layout 103, and so on. In some non-limiting embodiments or aspects, the plurality of direction may include all possible directions from the system 101 to direct the plurality of predefined acoustic waves onto the 3D layout 103.

Upon directing the plurality of predefined acoustic waves, the system 101 may be configured to receive modified acoustic waves, reflected by the 3D layout 103, in relation to each of the plurality of predefined acoustic waves. The received modified acoustic waves may be stored as the plurality of calibrated acoustic waves for the entity. Such plurality of calibrated acoustic waves may be generated for each of the plurality of the entities using the corresponding unique 3D layout 103 and stored in the memory 106 of the system 101. In some non-limiting embodiments or aspects, the plurality of calibrated acoustic waves may be mapped with identification details of the respective entity.

In real-time, the system 101 may be configured to identify a match between the modified acoustic wave with a calibrated acoustic wave. The calibrated acoustic wave may be selected from the plurality of calibrated acoustic waves that are pre-stored by the system 101. When the modified acoustic wave is matched with the calibrated acoustic wave, identified details mapped with the calibrated acoustic wave are obtained. The system 101 may be configured to use the received identification details to identify the entity. In some non-limiting embodiments or aspects, the identification details may include information associated with the entity. In some non-limiting embodiments or aspects, the information included in the identification details may be based on application of the system 101. For example, if the system 101 is implemented to identify the entity and initiate a transaction, the identification details received for the entity may include information relevant to initiate a transaction. If the system 101 is implemented to identify the entity and retrieve certain information desired by a user, the identification details received for the entity may include information as desired by the user. One or more other applications may be implemented in the system 101 to identify the entity and use the identification details based on an application.

In some non-limiting embodiments or aspects, the system 101 receives data for identifying the entity via the I/O interface 105. The received data may include, but is not limited to, at least one of the modified acoustic waves. Also, the system 101 may transmit data for identifying the entity via the I/O interface 105. The transmitted data may include, but is not limited to, predefined acoustic waves.

Figure 2:
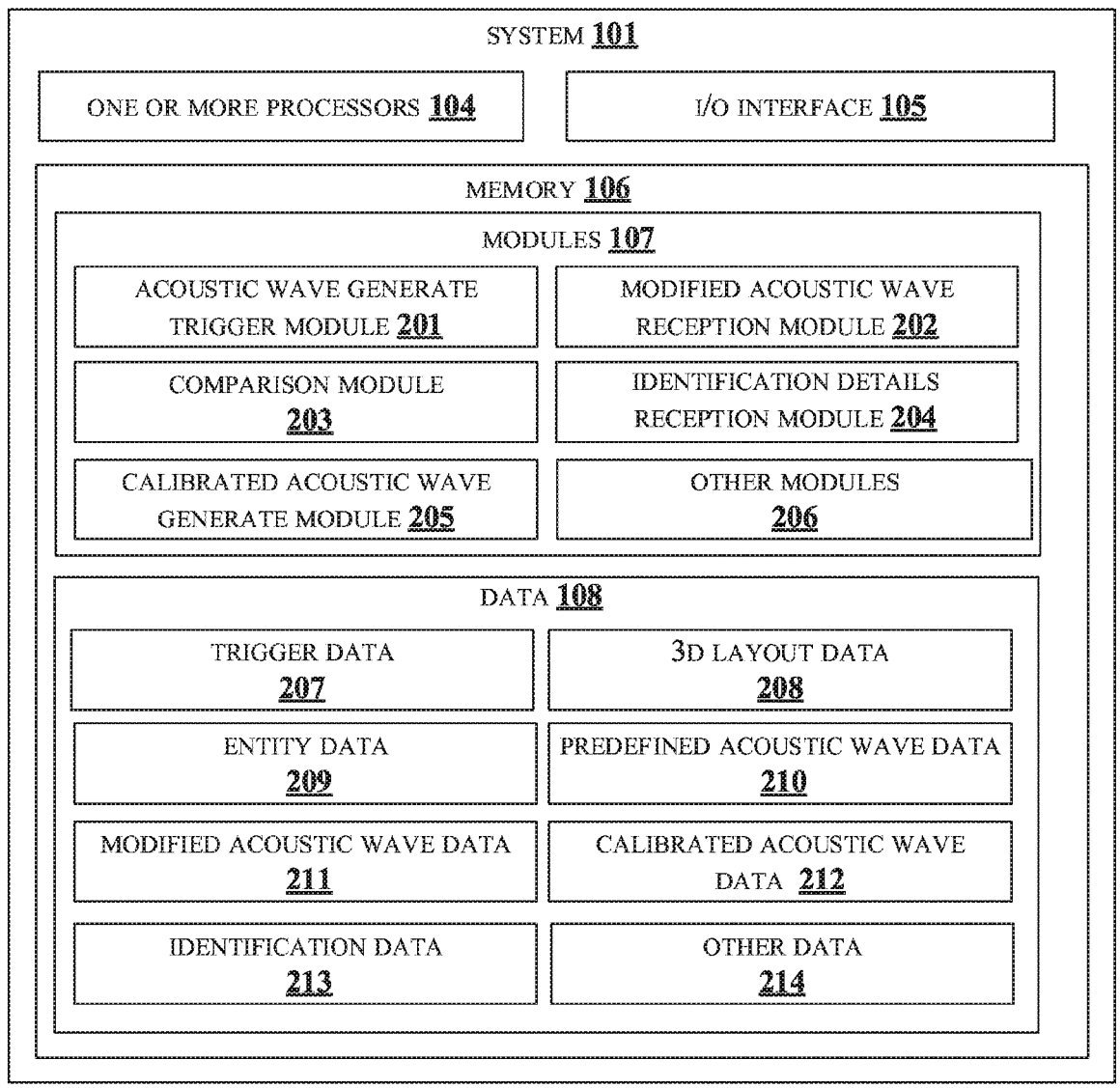
FIG. 2 illustrates a detailed block diagram of a system for identifying an entity using a 3D layout, in accordance with some non-limiting embodiments or aspects of the present disclosure.

FIG. 2 shows a detailed block diagram of the system 101 for identifying the entity based on the 3D layout 103, in accordance with some non-limiting embodiments or aspects of the present disclosure. The data 108 and the one or more modules 107 in the memory 106 of the system 101 are described herein in detail. In some non-limiting embodiments or aspects, the one or more modules 107 may include, but are not limited to, an acoustic wave generate trigger module 201, a modified acoustic wave reception module 202, a comparison module 203, an identification details reception module 204, a calibrated acoustic wave generation module 205, and one or more other modules 206 associated with the system 101.

In some non-limiting embodiments or aspects, the data 108 in the memory 106 may include on or more of the following: trigger data 207 (also referred to as trigger 207), 3D layout data 208, entity data 209 (also referred to as a plurality of entities 209), predefined acoustic wave data 210 (also referred to as a plurality of predefined acoustic waves 210), modified acoustic wave data 211 (also referred to as a modified acoustic wave 211), calibrated acoustic wave data 212 (also referred to as a plurality of calibrated acoustic waves 212), identification data 213, and other data 214 associated with the system 101.

In some non-limiting embodiments or aspects, the data 108 in the memory 106 may be processed by the one or more modules 107 of the system 101. In some non-limiting embodiments or aspects, the one or more modules 107 may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, Field-Programmable Gate Arrays (FPGA), Programmable System-on-Chip (PSoC), a combinational logic circuit, and/or other suitable components that provide the described functionality. The one or more modules 107 of the present disclosure function to identify the entity associated with the 3D layout 103. The one or more modules 107 along with the data 108, may be implemented in any system for identifying the entity.

The present disclosure may be implemented to identify the entity using the 3D layout 103 corresponding to the entity. The system 101 may be configured to provide services to the plurality of entities 209 that are registered with the system 101 using corresponding 3D layout 103. In some non-limiting embodiments or aspects, information associated with the plurality of entities may be stored as the entity data 209 in the memory 106. The information may include name, identification details, location, type, and the like associated with the plurality of entities. By registering with the system 101, a user of the system 101 may be able to easily identify the entity and access the identification details of the entity. In some non-limiting embodiments or aspects, the one or more other modules 206 of the system 101 may be configured to allow registration of an entity with the system 101. For the registration, the entity may be allotted with a unique 3D layout 103, which is embedded with a predefined number of 3D geometric figures. Each of the 3D geometric figures in the 3D layout 103 of each of the plurality of entities 209 may be associated with one or more of the following: a predefined shape, a predefined size, a predefined material, a predefined orientation, or any combination thereof. Information related to the predefined number, the predefined shape, the predefined size, the predefined material, and the predefined orientation of 3D geometric figures of the 3D layout 103 of each of the plurality of entities 209 may be stored as 3D layout data 208 in the memory 106.

Figure 3A:
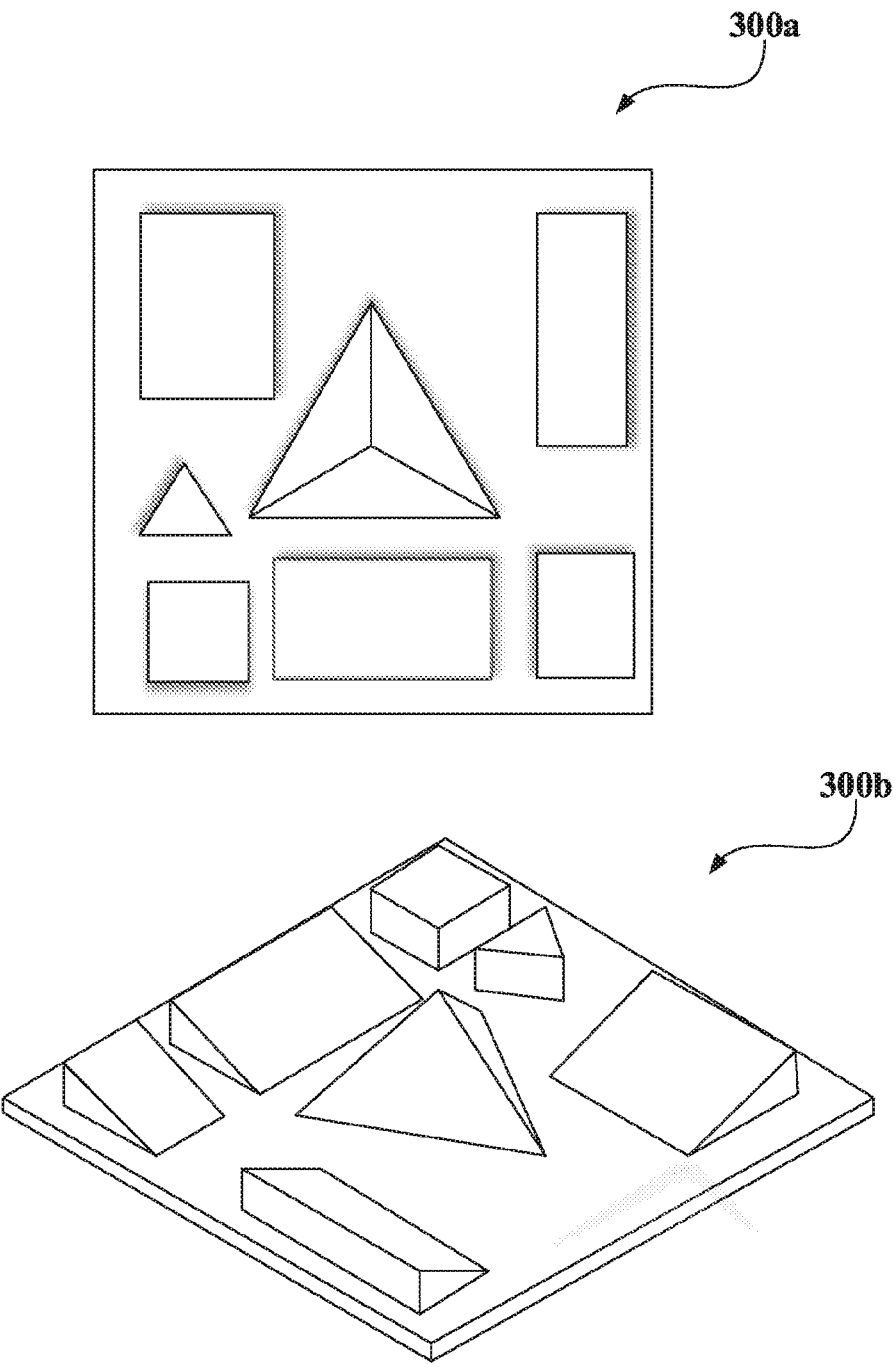
FIG. 3a illustrates exemplary representations of a 3D layout, in accordance with some non-limiting embodiments or aspects of present disclosure.

Each of the plurality of entities 209 may be registered with a unique 3D layout 103. FIG. 3a illustrates exemplary representations of the 3D layout 103, in accordance with some non-limiting embodiments or aspects of present disclosure. For example, the 3D layout shown in the figure is associated with a first entity. A top view of the 3D layout is illustrated in 3D layout 300a and a perspective view of the 3D layout is illustrated in 3D layout 300b. The first entity may be a vendor at a shopping mall. The 3D layout 300a may be placed near a shop of the vendor. A customer, using the system 101 and the 3D layout 300a, may identify the vendor.

In some non-limiting embodiments or aspects, during the registration of the entity with the 3D layout 103, the calibrated acoustic wave generation module 205 of the system 101 may be configured to generate the plurality of calibrated acoustic waves 212 for each of the plurality of entities 209. The plurality of calibrated acoustic waves 212 generated for the plurality of entities 209 may be stored in the memory 106. In some non-limiting embodiments or aspects, the plurality of calibrated acoustic waves 212 may be generated and stored in the repository associated with the system 101. The calibrated acoustic wave generation module 205 may be configured to communicate the generated plurality of calibrated acoustic waves 212 to the repository. The stored plurality of calibrated acoustic waves 212 may be retrieved and used, in real-time, to identify the entity. In some non-limiting embodiments or aspects, the plurality of calibrated acoustic waves 212 for an entity may be generated by, initially, directing (or causing the direction of) a plurality of predefined acoustic waves 210 onto a 3D layout 103 of the entity, for example, the 3D layout 300a (as illustrated in FIG. 3a) for the first entity. During the registration, the calibrated acoustic wave generation module 205 may be configured to generate the plurality of calibrated acoustic waves 212 for the 3D layout 300a.

Figure 3B:
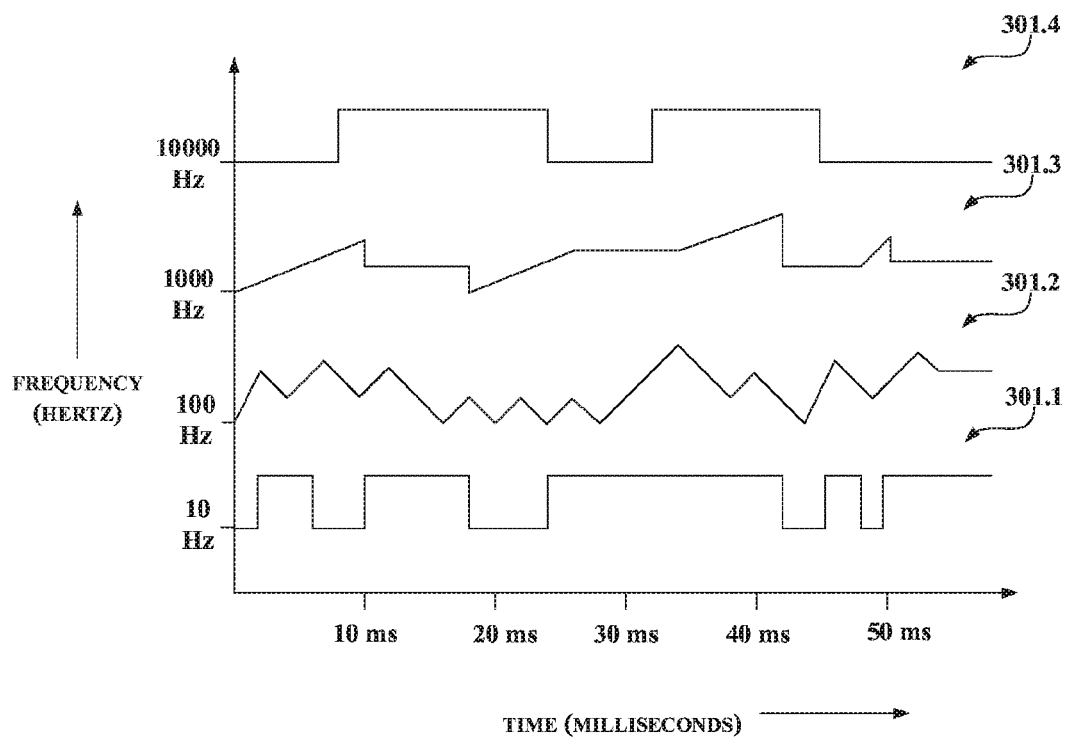
FIG. 3b illustrates exemplary representations of a plurality of predefined acoustic waves and corresponding calibrated acoustic waves, in accordance with some non-limiting embodiments or aspects of present disclosure.
Figure 3B:
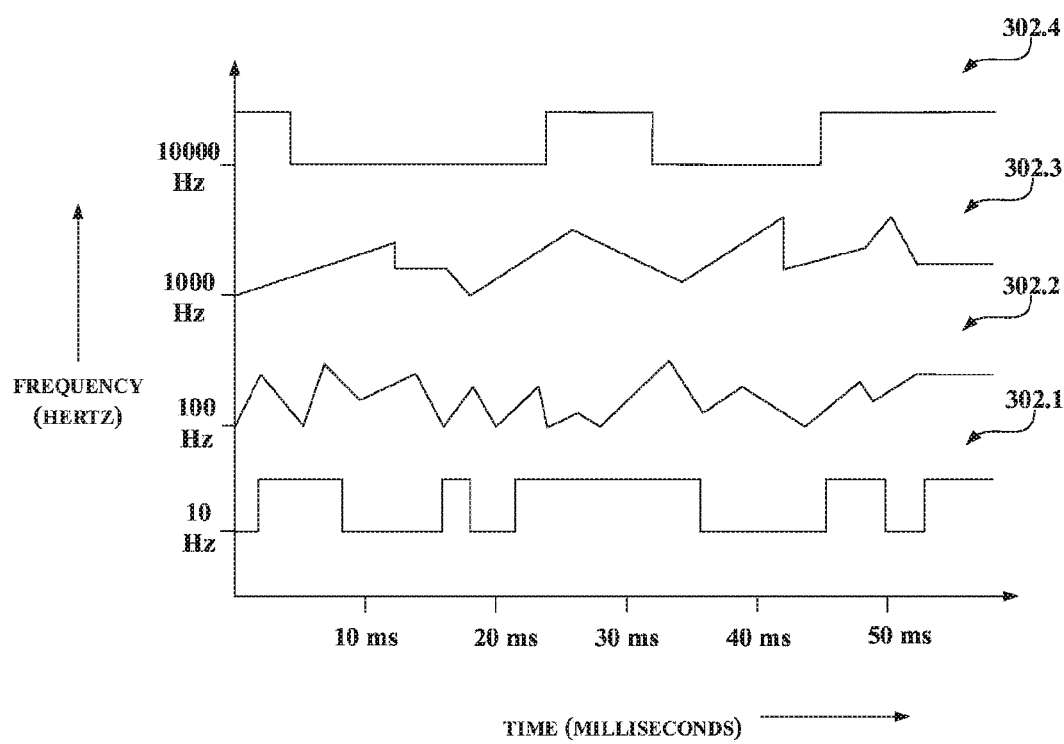

FIG. 3b illustrates exemplary representations of the plurality of predefined acoustic waves 301.1-301.4. In some non-limiting embodiments or aspects, the plurality of predefined acoustic waves 301.1-301.4 may be directed in each of the plurality of directions toward the 3D layout 300a. Upon directing the plurality of predefined acoustic waves 301.1-301.4, the calibrated acoustic wave generation module 205 may be configured to receive modified acoustic waves, reflected by the 3D layout 300a, in relation to each of the plurality of predefined acoustic waves 301.1-301.4. The received modified acoustic waves may be stored as the plurality of calibrated acoustic waves 212 for the first entity. FIG. 3b illustrates exemplary representations of the plurality of calibrated acoustic waves 301.2-302.4. Such a plurality of calibrated acoustic waves 212 may be generated for each of the plurality of the entities using corresponding unique 3D layout 103 and pre-stored by the calibrated acoustic wave generation module 205 in at least one of the memory 106 and the repository. In some non-limiting embodiments or aspects, the plurality of calibrated acoustic waves 212 may be mapped with identification details of the first entity. The plurality of calibrated acoustic waves 212, along with the identification details of the first entity, may be stored in at least one of the memory 106 and the repository.

In real-time, and using the registered 3D layout 103, a user may identify an entity from the plurality of entities 209. The acoustic wave generate trigger module 201 may be configured to trigger the acoustic wave generator 102 to generate an acoustic wave from the user. The acoustic wave generate trigger module 201 may be configured to receive a signal indicating the trigger 207 from the user and trigger the acoustic wave generator 102. The acoustic wave generate trigger module 201 may receive the signal via user interface associated with the system 101. In some non-limiting embodiments or aspects, one or more other components may be implemented in the system 101 to receive the trigger 207 from the user and provide the signal to the acoustic wave generate trigger module 201.

Figure 3C:
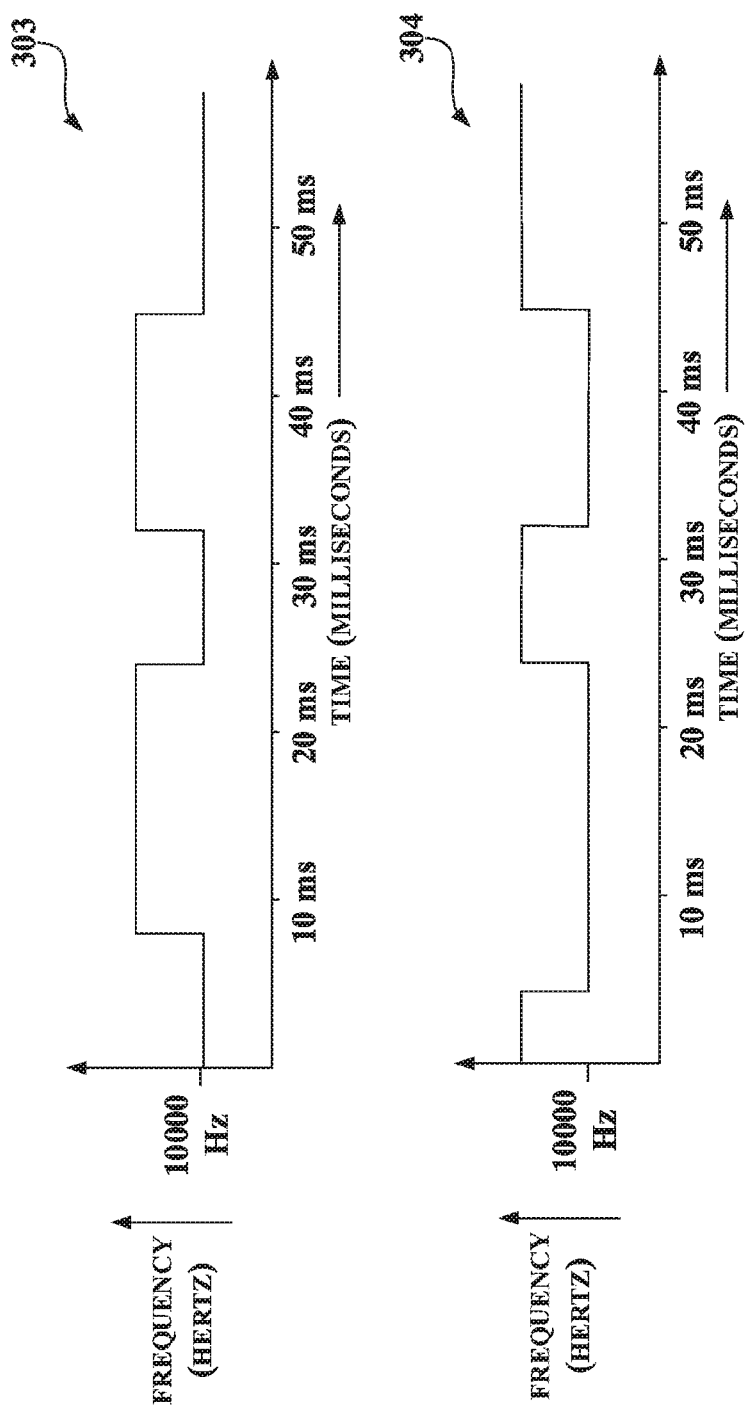
FIG. 3c illustrates exemplary representations of a predefined acoustic wave and modified acoustic wave, in accordance with some non-limiting embodiments or aspects of present disclosure.

Upon receipt of the signal, the acoustic wave generator 102 may communicate with the acoustic wave generate trigger module 201 to generate a predefined acoustic wave. The trigger 207 may be provided by the user by directing the system 101 toward the 3D layout 103. In some non-limiting embodiments or aspects, the predefined acoustic wave may be selected from the plurality of predefined acoustic waves 210, which are used for generating the plurality of calibrated acoustic waves 212. When the predefined acoustic wave is directed toward the 3D layout 103, the geometric figures of the 3D layout 103 may reflect a modified acoustic wave 211 for the predefined acoustic wave. The modified acoustic wave reception module 202 may be configured to receive the modified acoustic wave 211 from the 3D layout 103, such that, in real-time, the first entity may be identified by the customer. The customer may use his smartphone implementing the system 101 to identify the first entity. The customer may orient the smartphone toward the 3D layout 300a near the shop and provide the trigger 207 using the smartphone. The acoustic wave generate trigger module 201 may receive the signal associated with the trigger 207 and trigger the acoustic wave generator 102 to generate a predefined acoustic wave 303, as shown in FIG. 3c. The predefined acoustic wave 303 may be directed toward the 3D layout 300a, and the predefined acoustic wave 303 may be acoustic wave 301.4 selected from the predefined acoustic waves 301.1 . . . 301.4

Upon directing the predefined acoustic wave 303, the modified acoustic wave reception module 202 may be configured to receive a modified acoustic wave 304 reflected from the 3D layout 300a, as shown in FIG. 3c. In some non-limiting embodiments or aspects, the modification may be with respect to amplitude and frequency of the predefined acoustic wave 303.

Upon receiving the modified acoustic wave 211 for the predefined acoustic wave, the comparison module 203 may be configured to compare the modified acoustic wave 211 with the plurality of calibrated acoustic waves 212 associated with the plurality of entities. The comparison module 203 may be configured to identify a match between the modified acoustic wave 211 with a calibrated acoustic wave from the plurality of calibrated acoustic waves 212. For example, and for the first entity, the comparison module 203 is configured to compare the modified acoustic wave 304 with the plurality of calibrated acoustic waves 302.1-302.4 of the first entity to find a match for the modified acoustic wave 304 with the calibrated acoustic wave 302.4. When the modified acoustic wave 304 is matched with the calibrated acoustic wave 302.4, identified details mapped with the calibrated acoustic wave 302.4 may be received by the identification details reception module 204. The received identification details are used to identify the entity. The received identification details may be stored as identification data 213 in the memory 106. In some non-limiting embodiments or aspects, the received identification details may be used by the customer to initiate payment to the first entity. In some non-limiting embodiments or aspects, one or more other uses of the identification details may be implemented.

The other data 214 may store data, including temporary data and temporary files, generated by modules for performing the various functions of the system 101. The one or more modules 107 may also include other modules 206 to perform various miscellaneous functionalities of the system 101. It will be appreciated that such modules may be represented as a single module or a combination of different modules.

Figure 4A:
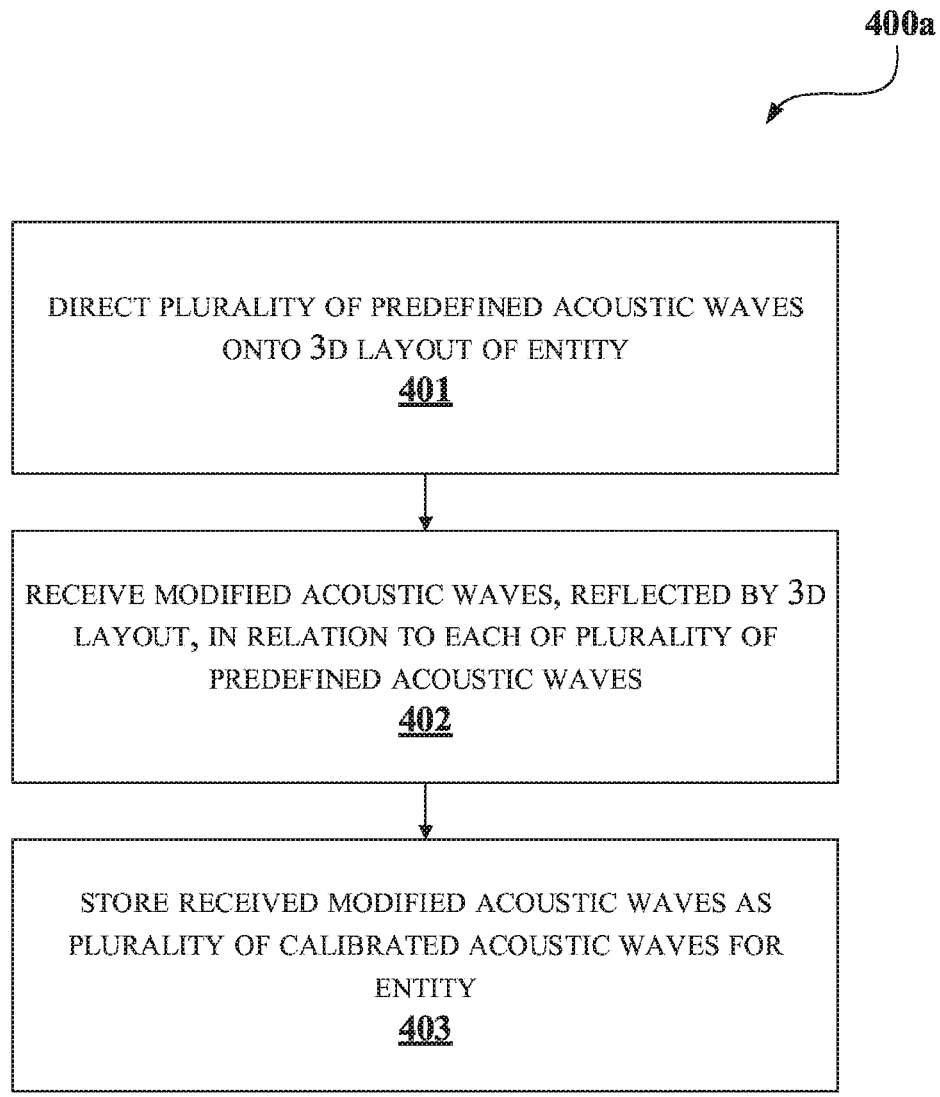
FIG. 4a illustrates a flowchart showing an exemplary method to generate calibrated acoustic waves for registration of an entity, in accordance with some non-limiting embodiments or aspects of present disclosure.

FIG. 4a illustrates a flowchart showing an exemplary method to generate the plurality of calibrated acoustic waves 212 for registration of an entity, in accordance with some non-limiting embodiments or aspects of the present disclosure. For the registration, initially, the entity is allocated with a unique 3D layout 103 embedded with the predefined number of 3D geometric figures. In some non-limiting embodiments or aspects, each of the 3D geometric figures in the 3D layout 103 is associated with one or more of a predefined shape, a predefined size, a predefined material, a predefined orientation, or any combination thereof. The 3D geometric figures may be solid objects with three dimensions including length, width, and height. The 3D geometric figures may be of the predefined shape created by combining a specific amount of curves, points, and lines. The predefined shape may include, but is not limited to, a torus, a cylinder, a cone, a cube, a cuboid, a triangular pyramid, a square pyramid, and the like. One or more other shapes may be implemented as the 3D geometric figure.

In some non-limiting embodiments or aspects, the 3D geometric figures may be associated with the predefined size with a particular thickness and depth. In some non-limiting embodiments or aspects, each of the 3D geometric figures may be made up of the predefined material selected from a material. The predefined material is selected such that the acoustic waves directed toward the 3D layout 103 are reflected by the 3D geometric figures. Examples of such materials may include, but are not limited to, glass, wood, plaster, brick, steel, concrete, and the like. Also, the 3D figures may be placed on the surface of the 3D layout 103 with the predefined orientation. For example, a 3D geometric figure may be placed perpendicular to the surface of the 3D layout 103. The 3D geometric figure may be placed inclined with respect to the surface of the 3D layout 103. With variation in the 3D geometric figures, and with respect to at least one of the predefined shape, the predefined size, the predefined material, and the predefined orientation, a unique 3D layout 103 may be allocated to the entity. Upon allocating the 3D layout 103, the plurality of calibrated acoustic waves 212 is generated for the 3D layout 103 of the entity.

At block 401, the calibrated acoustic wave generation module 205 may be configured to direct the plurality of predefined acoustic waves 210 onto the 3D layout 103 of the entity. Each of the plurality of predefined acoustic waves 210 is directed in each of the plurality of directions. At block 402, the calibrated acoustic wave generation module 205 may be configured to receive the modified acoustic waves, in relation to each of the plurality of predefined acoustic waves 210. The modified acoustic waves are obtained upon reflection of the plurality of predefined acoustic waves 210 on the 3D layout 103. At block 403, the calibrated acoustic wave generation module 205 may be configured to store the received modified acoustic waves as the plurality of calibrated acoustic waves 212 for the entity. In some non-limiting embodiments or aspects, along with the plurality of acoustic waves, identification details associated with the entity may also be stored for the entity.

In some non-limiting embodiments or aspects, the steps illustrated in FIG. 4a may be performed for each of the plurality of entities 209 to generate and store a plurality of calibrated acoustic waves 212 of each of the plurality of entities 209. In some non-limiting embodiments or aspects, the calibrated acoustic wave generation module 205 may be part of a user device implementing the system 101, which is operated in real-time, for identification of the entity. The calibrated acoustic wave generation module 205 may be implemented in any suitable system configured for deployment of the 3D layout 103 for the entity. An expert who may be authorized to register the 3D layout 103 to the entity may be configured to perform the steps of FIG. 4a using the system.

Figure 4B:
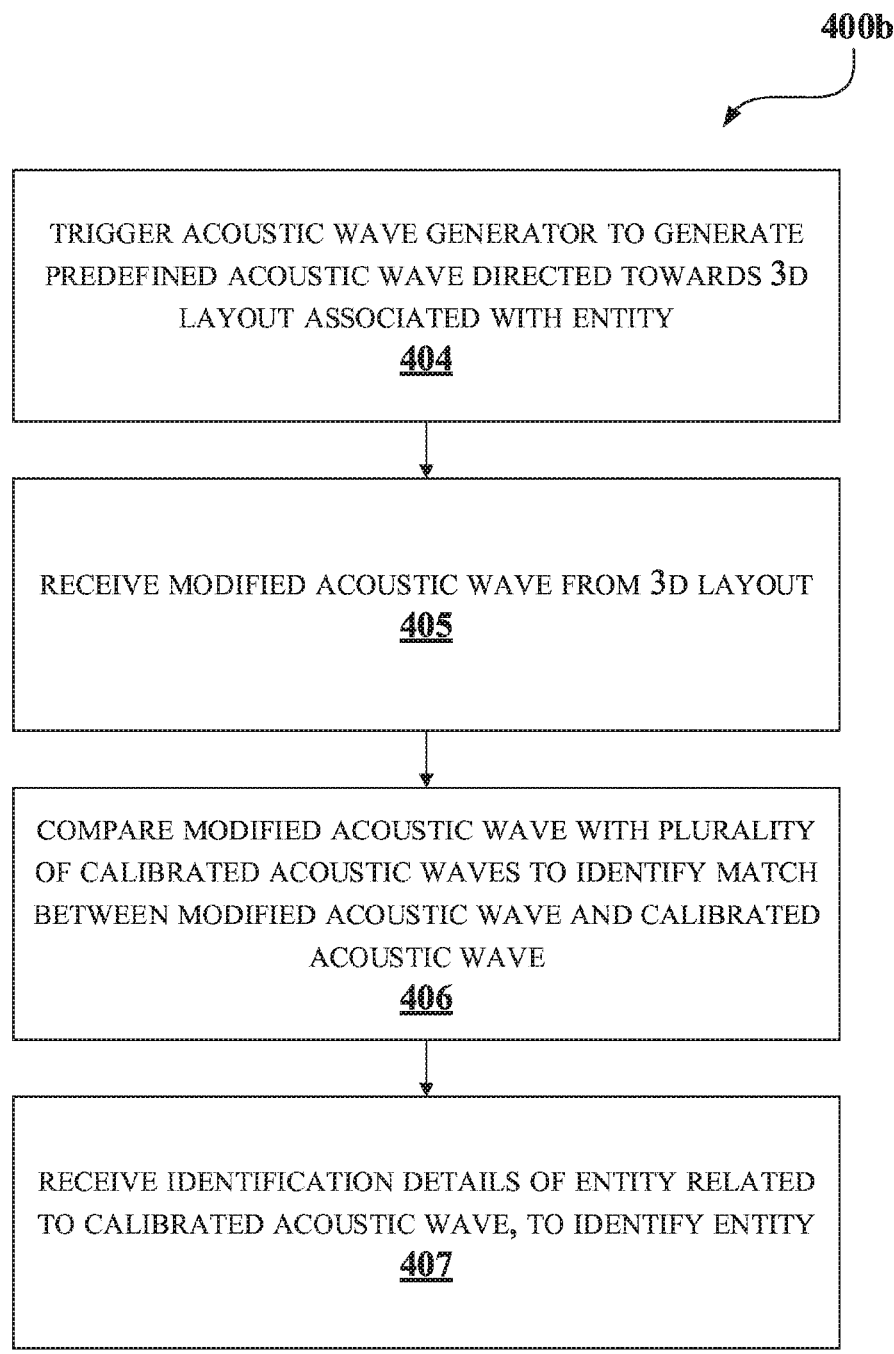
FIG. 4b illustrates a flowchart showing an exemplary method to identify an entity using a 3D layout, in accordance with some non-limiting embodiments or aspects of present disclosure.

FIG. 4b illustrates a flowchart 400b showing an exemplary method to identify the entity using the 3D layout 103, in accordance with some non-limiting embodiments or aspects of present disclosure. The steps of FIG. 4b may be performed in real-time for the identification of the entity.

At block 404, the acoustic wave generate trigger module 201 may be configured to the trigger 207 the acoustic wave generator 102 to generate the predefined acoustic wave directed toward the 3D layout 103 associated with the entity from the plurality of entities 209. As illustrated in FIG. 4a, the 3D layout 103 may be registered with the entity. At block 405, the modified acoustic wave reception module 202 may be configured to receive the modified acoustic wave 211 from the 3D layout 103. The modified acoustic wave 211 is obtained upon reflection of the predefined acoustic wave on the 3D layout 103. At block 406, the comparison module 203 may be configured to comparing the modified acoustic wave 211 with the plurality of calibrated acoustic waves 212 associated with the plurality of entities 209. By comparing a match between the modified acoustic wave 211 with a calibrated acoustic wave from the plurality of calibrated acoustic waves 212 may be identified. The plurality of calibrated acoustic waves 212 may be generated and pre-stored in the system 101. At block 407, upon identifying the match between the modified acoustic wave and the calibrated acoustic wave, the identification details reception module 204 may be configured to receive the identification details of the entity related to the calibrated acoustic wave and identify the entity.

In some non-limiting embodiments or aspects, the acoustic wave generate trigger module 201, the modified acoustic wave reception module 202, the comparison module 203, and the identification details reception module 204 of the system 101 may be part of the user device implementing the system 101, which operates to identify the entity in real-time. In some non-limiting embodiments or aspects, the comparison module 203 and the identification details reception module 204 of the system 101 may be part of a dedicated server or cloud-based server associated with the system 101. In such a case, the comparison module 203 may receive the modified acoustic wave and perform the comparison using the plurality of calibrated acoustic waves 212 retrieved from the repository. Further, the identification details reception module 204 may receive the identification details of the entity based on the comparison. Result of the identification details reception module 204 may be communicated to the user device for the user.

As illustrated in FIGS. 4a and 4b, the methods 400a and 400b may include one or more blocks/steps for executing processes in the system 101. The methods 400a and 400b may be described in the general context of computer executable instructions. Generally, computer executable instructions can include routines, programs, objects, components, data structures, procedures, modules, and functions, which perform particular functions or implement particular abstract data types.

The order in which the methods 400a and 400b is described may not be intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Non-limiting embodiments of the present disclosure provide accurate identification of an entity irrespective of proximity associated with a code by using 3D layout and acoustic waves. Non-limiting embodiments of the present disclosure eliminate "glitches" associated with image processing, and calibration of acoustic waves in the present disclosure aids in a simple matching technique to identify the entity.

Computing System

Figure 5:
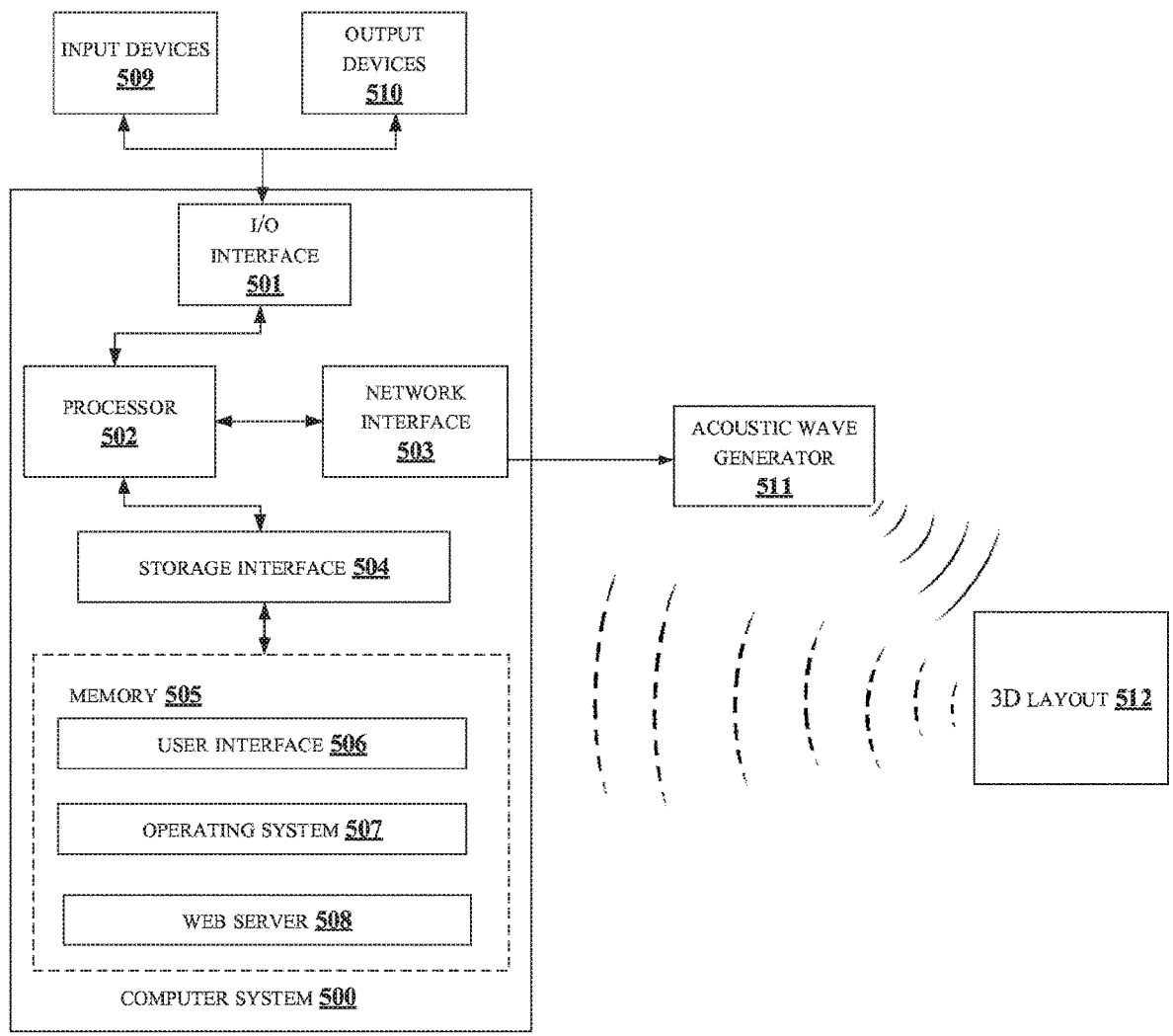
FIG. 5 illustrates a block diagram of an exemplary computer system for implementing non-limiting embodiments or aspects consistent with the present disclosure.

FIG. 5 illustrates a block diagram of an exemplary computer system 500 for implementing embodiments consistent with the present disclosure. In some non-limiting embodiments or aspects, the computer system 500 is used to implement the system 101. The computer system 500 may include a central processing unit ("CPU" or "processor") 502. The processor 502 may include at least one data processor for executing processes in Virtual Storage Area Network. The processor 502 may include specialized processing units such as integrated system (bus) controllers, memory management control units, floating point units, graphics processing units, digital signal processing units, etc.

The processor 502 may be disposed in communication with one or more input/output (I/O) devices 509 and 510 via an I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth®, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, remote control (infrared), camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma Display Panel (PDP), Organic light-emitting diode display (OLED), or the like), audio speaker, etc.

In some non-limiting embodiments or aspects, the computer system 500 may consist of the system 101. The processor 502 may be disposed in communication with a communication network (not shown in figure) via a network interface 503. The network interface 503 may communicate with the communication network. The network interface 503 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface 503 and the communication network, the computer system 500 may communicate with an acoustic wave generator 511 for identifying an entity using a 3D layout 512. The network interface 503 may employ connection protocols that include, but are not limited to, direct connect, Ethernet (e.g., twisted pair 10/100/1000 Base T), transmission control protocol/internet protocol (TCP/IP), token ring, IEEE 802.11a/b/g/n/x, etc.

The communication network includes, but is not limited to, a direct interconnection, an e-commerce network, a peer to peer (P2P) network, local area network (LAN), wide area network (WAN), wireless network (e.g., using Wireless Application Protocol), the Internet, Wi-Fi®, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some non-limiting embodiments or aspects, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, a user interface 506, an operating system 507, a web server 508 etc. In some non-limiting embodiments or aspects, computer system 500 may store user/application data, such as the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some non-limiting embodiments or aspects, the computer system 500 may implement a web server 508 stored program component. The web server 508 may be a hypertext viewing application, such as Microsoft® Internet Explorer®, Google™ Chrome™, Mozilla® Firefox®, Apple® Safari®, etc. Secure web browsing may be provided using Hypertext Transport Protocol Secure (HTTPS), Secure Sockets Layer (SSL), Transport Layer Security (TLS), etc. Web servers 508 may utilize facilities such as AJAX, DHTML, Adobe® Flash®, JavaScript®, Java®, Application Programming Interfaces (APIs), etc. In some non-limiting embodiments or aspects, the computer system 500 may implement a mail server stored program component. The mail server may be an Internet mail server such as Microsoft Exchange or the like. The mail server may utilize facilities such as ASP, ActiveX®, ANSI® C++/C #, Microsoft®.NET, Common Gateway Interface (CGI) scripts, Java®, JavaScript®, PERL®, PHP, Python®, WebObjects®, etc. The mail server may utilize communication protocols such as Internet Message Access Protocol (IMAP), Messaging Application Programming Interface (MAPI), Microsoft® Exchange, Post Office Protocol (POP), Simple Mail Transfer Protocol (SMTP), or the like. In some non-limiting embodiments or aspects, the computer system 500 may implement a mail client stored program component. The mail client may be a mail viewing application, such as Apple® Mail, Microsoft® Entourage®, Microsoft® Outlook®, Mozilla® Thunderbird®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, Compact Disc (CD) ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer-readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having", and variations thereof mean "including but not limited to", unless expressly specified otherwise. The enumerated listing of items does not imply that any or all of the items are mutually exclusive, unless expressly specified otherwise. The terms "a", "an", and "the" mean "one or more", unless expressly specified otherwise.

A description of an embodiment with several components in communication with each other does not imply that all such components are required. On the contrary a variety of optional components is described to illustrate the wide variety of possible embodiments of the invention.

The illustrated operations of FIGS. 4a and 4b show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
    triggering, with at least one processor, an acoustic wave generator to generate a first predefined acoustic wave;
    directing, or causing the direction of, with the at least one processor, a plurality of the first predefined acoustic waves toward a 3-dimensional (3D) layout associated with an entity of a plurality of entities, wherein each of the plurality of entities is registered with a corresponding unique 3D layout embedded with a predefined number of 3D geometric figures, wherein the 3D geometric figures of the 3D layout comprise a plurality of predefined shapes, the plurality of predefined shapes comprising at least one of the following: a cylinder, a cone, a cube, a cuboid, a triangular pyramid, a square pyramid, or any combination thereof;
    receiving, with the at least one processor, a first plurality of modified acoustic waves, reflected by the 3D layout, in relation to each of the plurality of the first predefined acoustic waves;
    storing, with the at least one processor, the first plurality of modified acoustic waves as a plurality of calibrated acoustic waves for the entity;
    directing, or causing the direction of, with the at least one processor, a plurality of a second predefined acoustic waves onto the 3D layout of the entity;
    receiving, with the at least one processor, a second plurality of modified acoustic waves, reflected by the 3D layout, in relation to each of the plurality of the second predefined acoustic waves;
    in response to receiving the second plurality of modified acoustic waves from the 3D layout, comparing, with the at least one processor, the second plurality of modified acoustic waves with the plurality of calibrated acoustic waves associated with the plurality of entities;
    determining, with the at least one processor, the entity associated with the 3D layout based on a match between a modified acoustic wave of the second plurality of modified acoustic waves and a calibrated acoustic wave from the plurality of calibrated acoustic waves;
    in response to determining the entity, retrieving, with the at least one processor, information associated with the entity, the information associated with the entity comprising at least three of the following: a name of the entity, a location of the entity, a type of the entity, identification details of the entity, information to initiate a payment transaction involving the entity, and or any combination thereof; and based on the information associated with the entity, initiating, with the at least one processor, a payment transaction for the entity associated with the 3D layout.

2. The computer-implemented method of claim 1, wherein each of the 3D geometric figures is associated with at least one of the following: a predefined size, a predefined material, a predefined orientation, or any combination thereof.

3. The computer-implemented method of claim 1, wherein the modified acoustic wave is obtained by reflecting the predefined acoustic wave on the 3D layout.

4. A system comprising:
one or more processors; and
a memory communicatively coupled to the one or more processors, wherein the memory stores processor-executable instructions, which, on execution, cause the one or more processors to:
  trigger an acoustic wave generator to generate a first predefined acoustic wave;
  direct, or cause the direction of, a plurality of the first predefined acoustic waves toward a 3-dimensional (3D) layout associated with an entity of a plurality of entities, wherein each of the plurality of entities is registered with a corresponding unique 3D layout embedded with a predefined number of 3D geometric figures, wherein the 3D geometric figures of the 3D layout comprise a plurality of predefined shapes, the plurality of predefined shapes comprising at least one of the following: a cylinder, a cone, a cube, a cuboid, a triangular pyramid, a square pyramid, or any combination thereof;
  receive a first plurality of modified acoustic waves, reflected by the 3D layout, in relation to each of the plurality of the first predefined acoustic waves;
  store the first plurality of modified acoustic waves as a plurality of calibrated acoustic waves for the entity;
  direct, or cause the direction of, a plurality of a second predefined acoustic waves onto the 3D layout of the entity;
  receive a second plurality of modified acoustic waves, reflected by the 3D layout, in relation to each of the plurality of the second predefined acoustic waves;
  in response to receiving the second plurality of modified acoustic waves from the 3D layout, compare the second plurality of modified acoustic waves with the plurality of calibrated acoustic waves associated with the plurality of entities;
  determine the entity associated with the 3D layout based on a match between a modified acoustic wave of the second plurality of modified acoustic waves and a calibrated acoustic wave from the plurality of calibrated acoustic waves;
  in response to determining the entity, retrieve information associated with the entity, the information associated with the entity comprising at least one of the following: a name of the entity, a location of the entity, a type of the entity, identification details of the entity, information to initiate a payment transaction involving the entity, and or any combination thereof; and
  based on the information associated with the entity, initiate a payment transaction for the entity associated with the 3D layout.

5. The system of claim 4, wherein each of the 3D geometric figures is associated with at least one of the following: a predefined size, a predefined material, a predefined orientation, or any combination thereof.

6. The system of claim 4, wherein the modified acoustic wave is obtained by reflecting the predefined acoustic wave on the 3D layout.

7. A non-transitory computer readable medium including instructions stored thereon that when processed by one or more processors cause a system to perform operations comprising:
  triggering an acoustic wave generator to generate a first predefined acoustic wave;
  directing, or causing the direction of, a plurality of the first predefined acoustic waves toward a 3-dimensional (3D) layout associated with an entity of a plurality of entities, wherein each of the plurality of entities is registered with a corresponding unique 3D layout embedded with a predefined number of 3D geometric figures, wherein the 3D geometric figures of the 3D layout comprise a plurality of predefined shapes, the plurality of predefined shapes comprising at least one of the following: a cylinder, a cone, a cube, a cuboid, a triangular pyramid, a square pyramid, or any combination thereof;
  receiving a first plurality of modified acoustic waves, reflected by the 3D layout, in relation to each of the plurality of the first predefined acoustic waves;
  storing the first plurality of modified acoustic waves as a plurality of calibrated acoustic waves for the entity;
  directing, or causing the direction of, a plurality of a second predefined acoustic wave onto the 3D layout of the entity;
  receiving a second plurality of modified acoustic waves, reflected by the 3D layout, in relation to each of a plurality of the second predefined acoustic waves;
  in response to receiving the second plurality of modified acoustic waves from the 3D layout, comparing the second plurality of modified acoustic waves with a plurality of calibrated acoustic waves associated with the plurality of entities;
  determine the entity associated with the 3D layout based on a match between a modified acoustic wave of the second plurality of modified acoustic waves and a calibrated acoustic wave from the plurality of calibrated acoustic waves;
  in response to determining the entity, retrieve information associated with the entity, the information associated with the entity comprising at least three of the following: a name of the entity, a location of the entity, a type of the entity, identification details of the entity, information to initiate a payment transaction involving the entity, and or any combination thereof; and
  based on the information associated with the entity, initiate a payment transaction for the entity associated with the 3D layout.

8. The non-transitory computer readable medium of claim 7, wherein each of the 3D geometric figures is associated with at least one of the following: a predefined size, a predefined material, a predefined orientation, or any combination thereof.

9. The non-transitory computer readable medium of claim 7, wherein the modified acoustic wave is obtained by reflecting the predefined acoustic wave on the 3D layout.

\* \* \* \* \*

UNITED STATES PATENT AND TRADEMARK OFFICE
CERTIFICATE OF CORRECTION

PATENT NO. : 12,228,686 B2
APPLICATION NO. : 17/763689
DATED : February 18, 2025
INVENTOR(S) : Ved Prakash Sajjan K Agarwal It is certified that error appears in the above-identified patent and that said Letters Patent is hereby corrected as shown below:

In the Specification

Column 1, Line 10, delete "entirely." and insert -- entirety. --

In the Claims

Column 21, Line 1, Claim 1, delete "and or" and insert -- and/or --

Column 21, Line 57, Claim 4, delete "one" and insert -- three --

Column 21, Line 61, Claim 4, delete "and or" and insert -- and/or --

Column 22, Line 53, Claim 7, delete "and or" and insert -- and/or --

Signed and Sealed this
Twenty-ninth Day of April, 2025

Coke Morgan Stewart
*Acting Director of the United States Patent and Trademark Office*